(12) United States Patent
Kim et al.

(10) Patent No.: US 11,620,006 B2
(45) Date of Patent: Apr. 4, 2023

(54) DISPLAY CONTROL SYSTEM USING KNOB

(71) Applicant: HYUNDAI MOBIS CO., LTD., Seoul (KR)

(72) Inventors: Kyung Hoon Kim, Yongin-si (KR); Myung Bin Choi, Seoul (KR); Seung Hwan Lee, Hwaseong-si (KR); Sung Joon Ahn, Seoul (KR); Tae Hun Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/369,046

(22) Filed: Jul. 7, 2021

(65) Prior Publication Data

US 2022/0011880 A1    Jan. 13, 2022

(30) Foreign Application Priority Data

Jul. 7, 2020   (KR) .................. 10-2020-0083758
Jul. 7, 2020   (KR) .................. 10-2020-0083759

(51) Int. Cl.
*G06F 3/0362*   (2013.01)
*B60K 37/06*    (2006.01)

(52) U.S. Cl.
CPC ............ *G06F 3/0362* (2013.01); *B60K 37/06* (2013.01); *B60K 2370/126* (2019.05)

(58) Field of Classification Search
CPC .... G06F 3/0362; G06F 3/0312; G06F 3/0346; G06F 3/041; G06F 3/0393; B60K 2370/126; B60K 37/06
See application file for complete search history.

(56) References Cited

U.S. PATENT DOCUMENTS

| | | | | |
|---|---|---|---|---|
| 2014/0184510 A1* | 7/2014 | Jeong | ............... | G06F 3/041 345/163 |
| 2017/0286057 A1* | 10/2017 | Zhang | ............... | G06F 3/165 |
| 2018/0154774 A1* | 6/2018 | Park | ............... | G06F 3/017 |

\* cited by examiner

*Primary Examiner* — Hang Lin
(74) *Attorney, Agent, or Firm* — NovoTechIP International PLLC

(57) ABSTRACT

A display control system using a knob includes an input part which receives at least one piece of position information of a knob within a movement range in an area under a display and position information of the knob within a preset plane area, a memory in which a display control program using the position information of the knob is stored, and a processor which executes the program, and the processor controls a function in a vehicle in consideration of the position information according to movement of the knob and operation information of the knob.

9 Claims, 21 Drawing Sheets

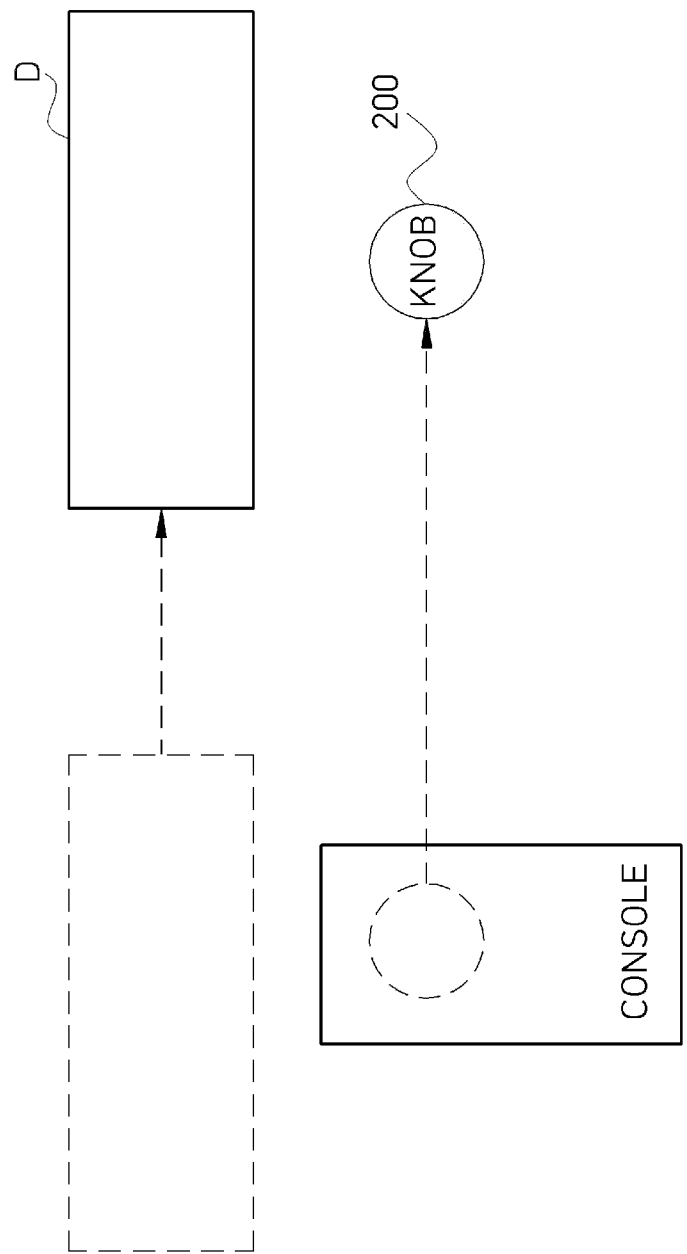

FIG. 6A
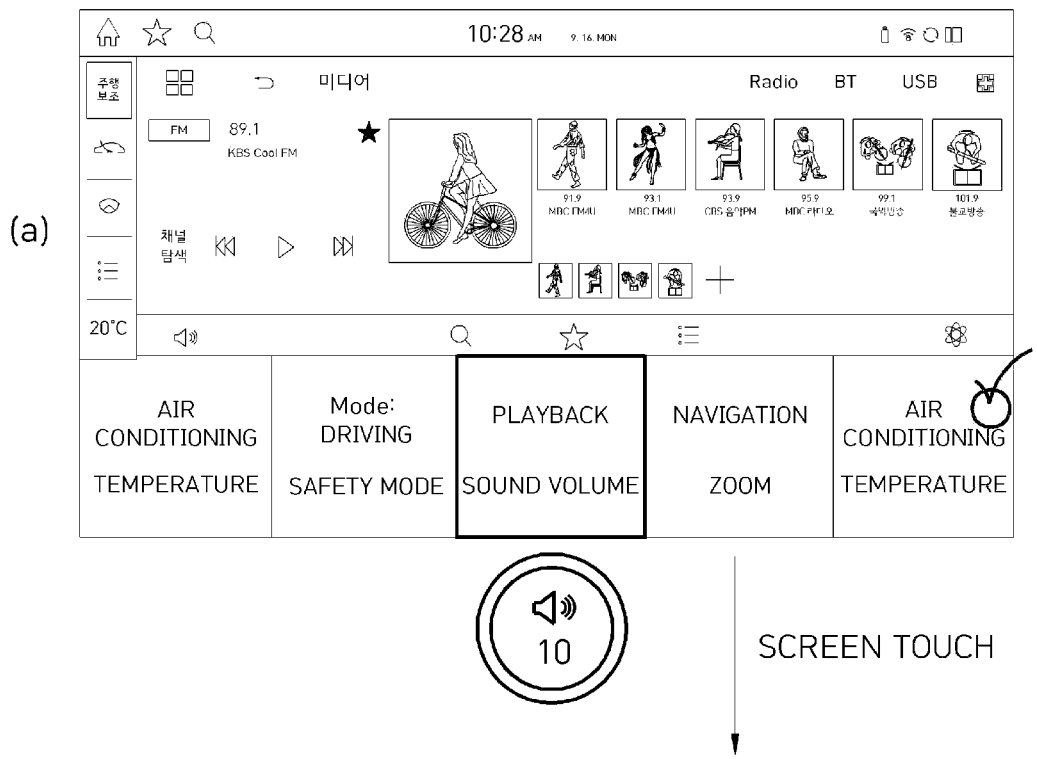
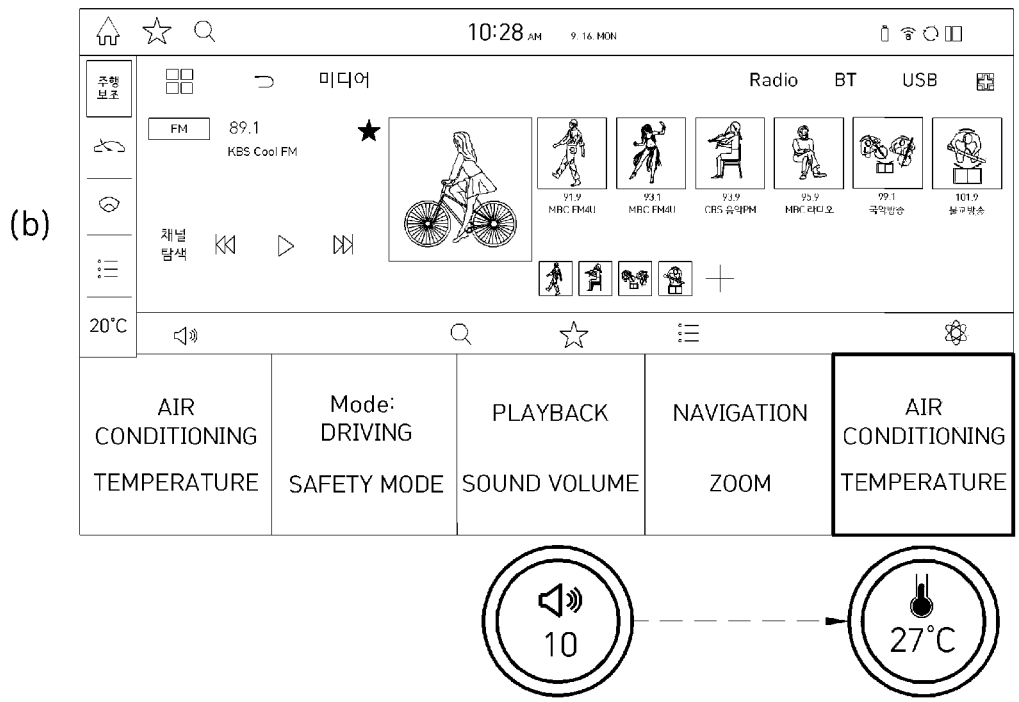

DISPLAY CONTROL SYSTEM USING KNOB

CROSS-REFERENCE TO RELATED APPLICATION

This application claims priority to and the benefit of Korean Patent Application No. 10-2020-0083759, filed on Jul. 7, 2020 and Korean Patent Application No. 10-2020-0083758, filed on Jul. 7, 2020, the disclosure of which is incorporated herein by reference in its entirety.

BACKGROUND

1. Field of the Invention

The present system relates to a display control system using a knob.

2. Discussion of Related Art

According to the conventional technology, functions (a temperature control function, an air quantity control function, and the like) required in a vehicle are performed using an input device (knob).

However, since it is impossible to separate such a knob from a display unit, there is a problem from a usability viewpoint in that there is not spatial compatibility between a manipulation target screen and a controller, and there is a limitation in that various user conveniences may not be provided.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, A display control system using a knob includes an input part which receives at least one piece of position information of a knob within a movement range in an area under a display and position information of the knob within a preset plane area, a memory in which a display control program using the position information of the knob is stored, and a processor which executes the program, and the processor controls a function in a vehicle in consideration of the position information according to movement of the knob and operation information of the knob.

In a case in which the knob moves within the movement range to a position corresponding to a function menu which is displayed in the area under the display, the processor transmits a control command for the corresponding function menu in consideration of position information of the knob.

In a case in which a tab input for the knob is applied at a position corresponding to the function menu, the processor calls a pop-up screen for the corresponding function.

In a case in which a knob manipulation is recognized at a position corresponding to sound volume control on the function menu, the processor controls media volume when a medium is operating and controls entire system volume when the medium is not operated.

The processor performs control for the function menu in consideration of rotation, press, and press holding time.

In a case in which the knob is moved to a favorite function menu area, the processor displays a menu corresponding to favorites on the display and displays a function selected by a knob manipulation on a main screen.

When the knob is removed from the movement range in the area under the display and installed in a console which is the preset plane area, the processor performs display control in consideration of position information of the knob within a console area in the same proportion as a display screen.

The processor displays a cursor on the display screen according to movement of the knob within the console area.

The processor provides a window switching function when the cursor is moved according to a knob manipulation for a divided area in the display.

In another general aspect, a method of controlling a display using a knob includes receiving a touch input signal for a display; and moving a position of the knob to perform function control of an area of the display to which the touch input signal is applied.

Other features and aspects will be apparent from the following detailed description, the drawings, and the claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 4A and FIG. 4B are set of views illustrating the display that is controlled when the knob is removed according to one embodiment of the present invention;

FIG. 6A and FIG. 6B are set of views illustrating a knob that is moved to a touch area according to another embodiment of the present invention;

DETAILED DESCRIPTION OF EXEMPLARY EMBODIMENTS

The above-described objectives and the other objectives, advantages, and features of the present invention and methods of achieving the same will be clearly understood with reference to the following embodiments and the accompanying drawings.

However, the present invention is not limited to the embodiments to be disclosed below and may be implemented in various different forms. However, the following embodiments are provided in order to easily explain the objectives, components, and effects of the present invention to those skilled in the art, and the scope of the present invention is only defined by the appended claims.

Meanwhile, the terms used herein are provided only to describe the embodiments of the present invention and not for purposes of limitation. Unless the context clearly indicates otherwise, the singular forms include the plural forms. It will be understood that the terms "comprise" or "comprising," when used herein, specify some stated components, steps, operations and/or elements, but do not preclude the presence or addition of one or more other components, steps, operations and/or elements.

Figure 1:
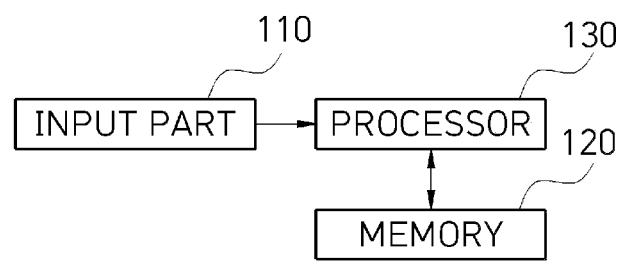
FIG. 1 is a view illustrating a display control system using a knob according to an embodiment of the present invention.

FIG. 1 is a view illustrating a display control system using a knob according to an embodiment of the present invention.

The display control system using a knob according to one embodiment of the present invention includes an input part 110 which receives position information of a knob, a memory 120 which stores a display control program according to a position of the knob, and a processor 130 which executes the program, and the processor 130 changes a function control tab displayed on a display in consideration of the position information according to movement of the knob.

When the knob is moved from under a driver seat display to under a passenger seat display, the processor 130 displays a control tab which is less related to convenience functions in a passenger seat display area and a control tab which is highly related to driving in a driver seat display area.

The processor 130 changes an area division of the display in consideration of the position information according to the movement of the knob and controls displayed content to be changed according to the change of the area division.

The processor 130 maintains a screen area for a predetermined function in the display at the same display area with respect to a position of a driver even in a status in which the display is moved.

When a position of the display is changed according to the movement of the knob, the processor 130 changes the number of display screen areas and changes a type of content to be displayed according to the changed number of the screen areas.

In a case in which the knob is removed from a console, the processor 130 moves an area of the display in consideration of a present position of the removed knob.

In a case in which the knob is moved from the driver seat area to the passenger seat area, the processor 130 controls the display moved to the passenger seat to display a personalized screen provided to a passenger of a passenger seat and displays a driving related function screen on a windshield in front of the driver seat.

In a case in which the knob is moved from the passenger seat area to the driver seat area, the processor 130 displays the personalized screen provided to the passenger of the passenger seat on the windshield in front of the passenger seat, and in a case in which the personalized screen is determined that driving is hindered, the processor 130 deactivates a display function of the windshield in front the passenger seat.

The processor 130 transmits a control command to tilt the display in consideration of present position information of the knob and a gaze of a user at a present position of the knob.

A display control system using a knob according to another embodiment of the present invention includes an input part 110 which receives a touch input signal for a display area, a memory 120 in which a display control program according to the touch input signal is stored, and a processor 130 which executes the program, and the processor 130 moves a knob to functionally control an area to which the touch input signal is applied.

The processor 130 controls the knob to be moved to under the area to which the touch input signal is applied within a limited knob moving area.

The processor 130 controls the knob to be moved on the display area to which the touch input signal is applied.

The processor 130 compares ease of function control between control through a touch input and control through a knob manipulation, and in a case in which it is determined that the function control through the knob manipulation is easier, the processor 130 moves the knob on the display area to which the touch input signal is applied.

The processor 130 displays seat arrangement information in a vehicle and functions provided through seat areas on the display, and in a case in which a touch input for a corresponding function area is applied, the processor 130 moves the knob to the corresponding area.

In a case in which the display is rotated, the processor 130 calculates coordinates in the corresponding display to move the knob.

When a touch input for a navigation screen is applied, the processor 130 provides a function for controlling zoom-in and zoom-out using the knob, and when a touch input for route information is applied through the navigation screen, the processor 130 provides a function for controlling display of next route and related road information using the knob.

A display control system using a knob according to still another embodiment of the present invention includes an input part 110 which receives at least one piece of position information of a knob within a movement range in an area under a display and position information of the knob within a preset plane area, a memory 120 in which a display control program using the position information of the knob is stored, and a processor 130 which executes the program, and the processor 130 controls a function in a vehicle in consideration of the position information according to movement of the knob and operation information of the knob.

In a case in which the knob moves within the movement range to a position corresponding to a function menu which is displayed in the area under the display, the processor 130 transmits a control command for the corresponding function menu in consideration of position information of the knob.

In a case in which a tab input for the knob is applied at a position corresponding to the function menu, the processor 130 calls a pop-up screen for the corresponding function.

In a case in which a knob manipulation is recognized at a position corresponding to sound volume control on the function menu, the processor 130 controls media volume when a medium is operating and controls entire system volume when the medium is not operated.

The processor 130 performs control for the function menu in consideration of rotation, press, and press holding time.

In a case in which the knob is moved to a favorite function menu area, the processor 130 displays a menu corresponding to favorites on the display and displays a function selected by a knob manipulation on a main screen.

When the knob is removed from the movement range in the area under the display and installed in a console which is the preset plane area, the processor 130 performs display control in consideration of position information of the knob within a console area in the same proportion as a display screen.

The processor 130 displays a cursor on the display screen according to movement of the knob within the console area.

The processor 130 provides a window switching function when the cursor is moved according to a knob manipulation for a divided area in the display.

Figure 2:
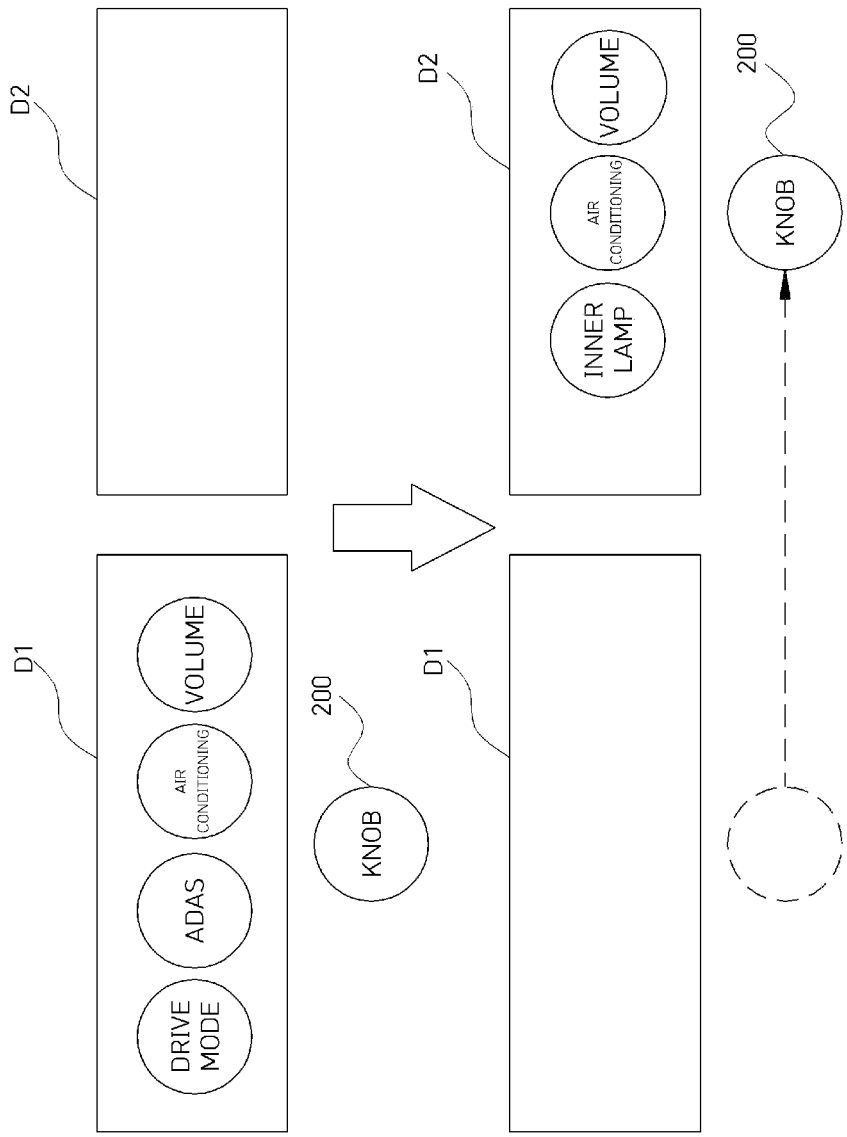
FIG. 2 is a view illustrating a display that is controlled by moving a knob according to one embodiment of the present invention.

FIG. 2 is a view illustrating a display that is controlled by moving a knob according to one embodiment of the present invention.

In a driver seat display D1, a menu including drive mode, advanced driver assistance systems (ADAS), air conditioning, and volume is displayed, and in a state in which there is no displayed item in a passenger seat display D2, a knob 200 is moved from under the driver seat display D1 to under the passenger seat display D2.

As the knob 200 is moved from under the driver seat display D1 to under the passenger seat display D2, available functions are changed, for example, in the driver seat display D1, functions, such as the ADAS and the drive mode, which are directly related to driving, may be manipulated, and in the passenger seat display D2, restricted functions, such as interior lamp, air conditioning, and volume, which are relatively less related to the driving, may be performed.

The processor 130 controls function control tabs displayed on the driver seat display D1 and the passenger seat display D2 in consideration of movement information of the knob 200.

As will be described below, as the knob 200 is manipulated to be rotated or pressed under a specific function control tab area or on the specific function control tab area, setting of a specific function is adjusted.

Figure 3:
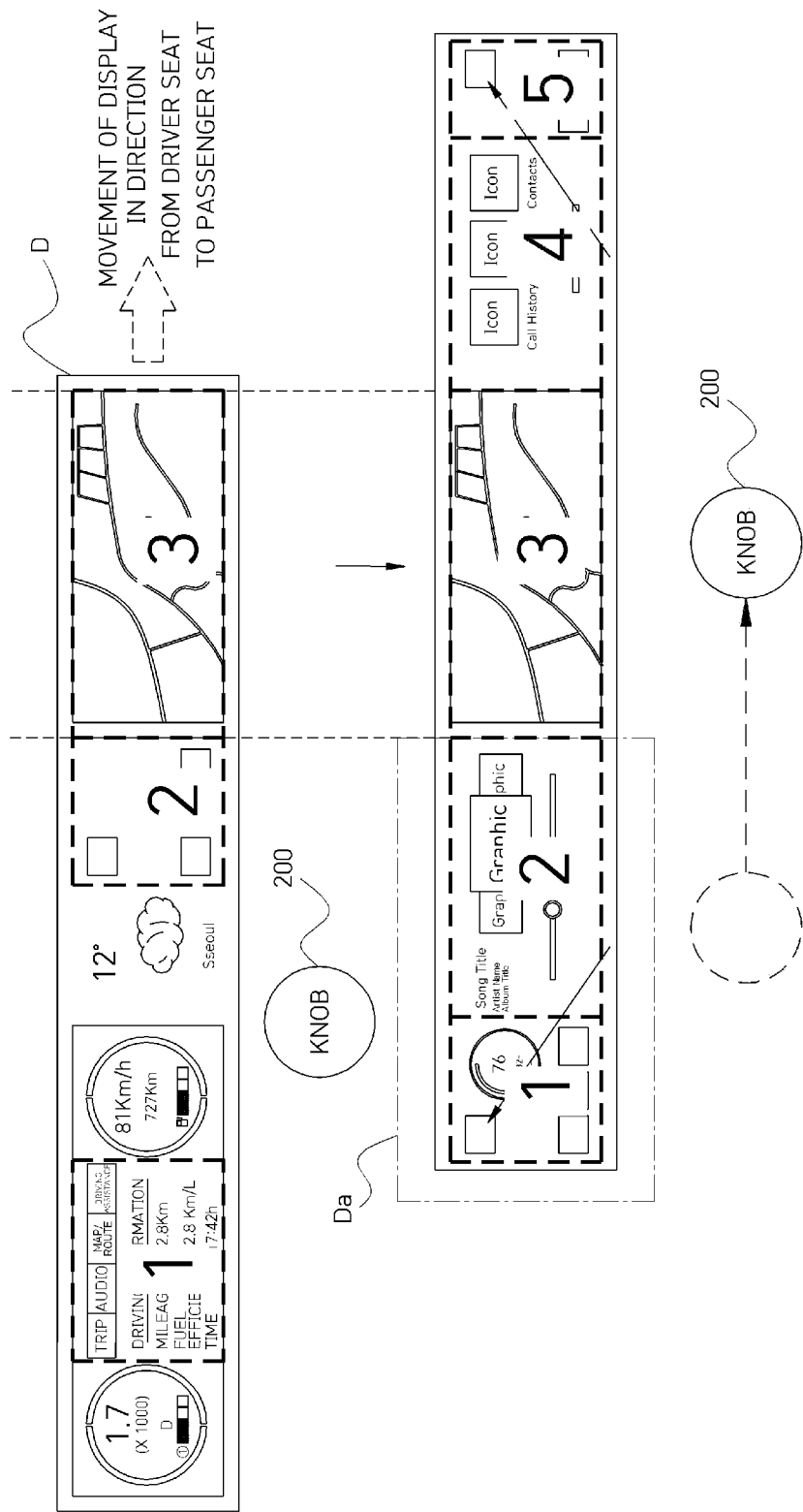
FIG. 3 is a view illustrating a change in user interface (UI) of the display when the knob is moved according to one embodiment of the present invention.

FIG. 3 is a view illustrating a change in user interface (UI) of the display according to one embodiment of the present invention.

A big screen display D is divided into a plurality of areas and moves in a direction from the driver seat to the passenger seat.

As the big screen display D is moved, a position of the knob may be changed, or as the position of the knob is changed, a position of the big screen display D may be changed.

As the big screen display D is moved, information and the UI displayed on the big screen display D are changed, and for example, a cluster and audio video navigation (AVN) are displayed on the big screen display D in front of the driver seat, and a mini-cluster and an AVN 3 screen are displayed thereon in front of the passenger seat.

Movement of the knob 200 occurs within a mechanically limited area between the driver seat and the passenger seat, or the knob 200 is detachably attached to a center fascia, and the processor 130 controls the information and the UI of the big screen display D in consideration of a state in which the knob 200 is spatially moved.

Figure 4A:
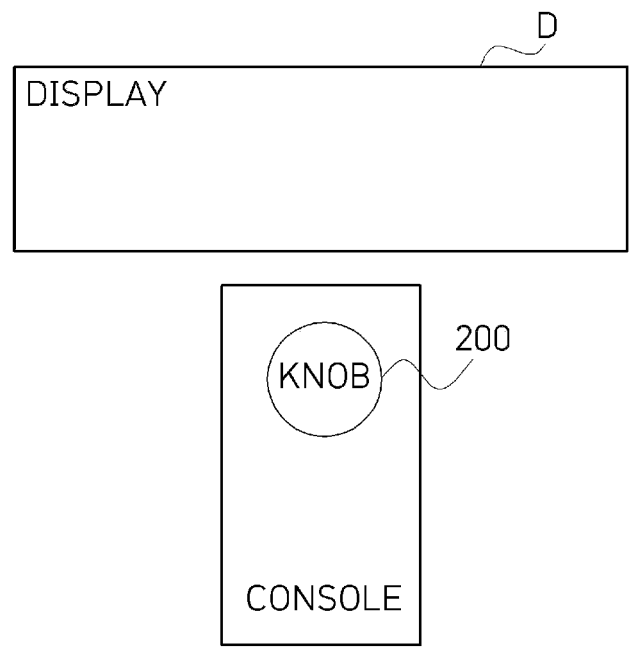

FIG. 4A and FIG. 4B are set of views illustrating the display that is controlled when the knob is removed according to one embodiment of the present invention.

As the knob 200 positioned on the console under the display D is removed from the console, the processor 130 moves the display D in consideration of the removal and a movement direction of the knob 200. Referring to FIG. 4A and FIG. 4B, as the knob 200 is removed from the console and moved in the direction from the driver seat to the passenger seat, a position of the display D is adjusted so that the display D is viewed from both of the driver seat and the passenger seat.

When the knob 200 is moved from the driver seat to the passenger seat, a personalized screen related to a passenger is displayed on the display D moved to the passenger seat, and a driving related screen is displayed as a head-up display (HUD) on a windshield in front of the driver seat.

When the knob 200 is moved from the passenger seat to the driver seat, the driving related screen is displayed on the display D moved to the driver seat, and the personalized screen related to the passenger of the passenger seat is displayed on the windshield in front of the passenger seat. In this case, in a case in which driving is hindered by displaying information on the windshield in front of the passenger seat, the display of the personalized screen related to the passenger of the passenger seat is turned off.

Figure 5A:
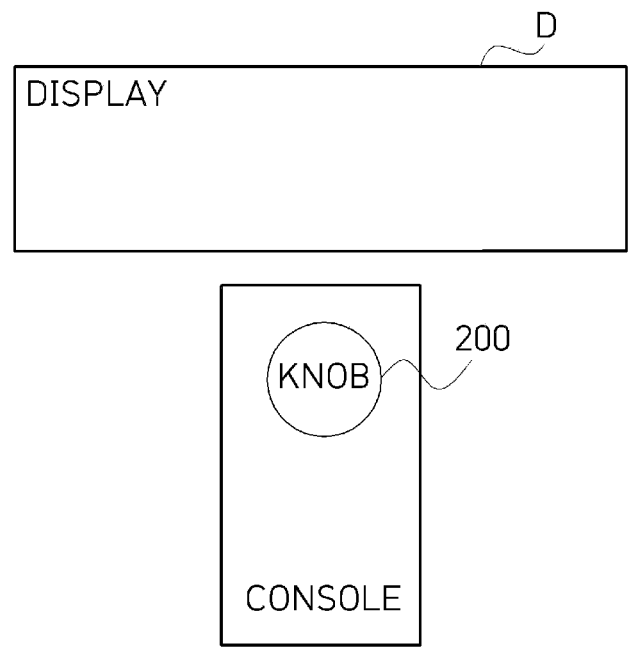
FIG. 5A and FIG. 5B are set of views illustrating a display unit that is tilted when the knob is removed according to one embodiment of the present invention.
Figure 5B:
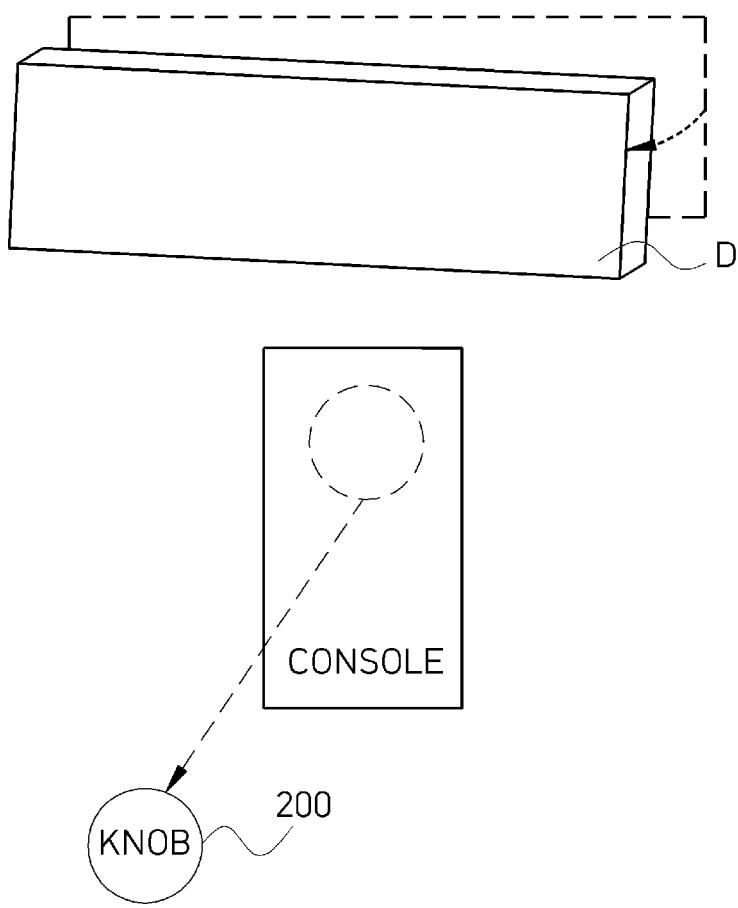

FIG. 5A and FIG. 5B are set of views illustrating the display D that is tilted when the knob is removed according to one embodiment of the present invention.

As the knob 200 positioned on the console under the display D is removed from the console, the display D is tilted in consideration of a position of the knob 200.

In a case in which a passenger in a rear seat takes the knob 200 (manipulation system), the display D is tilted so that a screen of the display D is easily viewed from the passenger having the knob in the rear seat.

In relation to a position of the knob in the vehicle, position information of the knob is checked using ultra wide band (UWB) technology.

In order to provide a local based service (LBS), technologies such as a global positioning system (GPS), Wi-Fi, and Bluetooth are used, but it is difficult to precisely check a position. However, the UWB (6 to 8 GHz and 500 MHz or higher bandwidth) has advantages of a wide frequency band, lower power communication, and high accuracy of about several tens of centimeters.

Position tracking technologies based on a GPS and mobile communication networks according to the related art respectively have error ranges of 5 to 50 m and 50 to 200 m, and in the case of the GPS, a problem may occur to catch signals transmitted from satellites in urban buildings.

In the case of the Wi-Fi, position tracking is performable with a low cost, but since a use frequency band is narrow, in a case in which there are many position tracking targets, a channel division limitation may occur. In addition, a mobile terminal may be disconnected from a fixed Wi-Fi access point (AP).

In the case of Bluetooth, it is possible to arrange a plurality of sensors at a low cost, however, since a communication latency is large, the Bluetooth is not suitable for tracking a position in a dynamic environment in real time.

Unlike Wi-Fi and Bluetooth, the UWB uses a wide frequency band and may transmit a large amount of information at a high transmission speed with low power.

Position tracking using the UWB technology has advantages of a low error rate of about 20 centimeters, a high transmission rate for an obstacle, and not being affected by another signal such as a Wi-Fi signal.

Figure 6B:
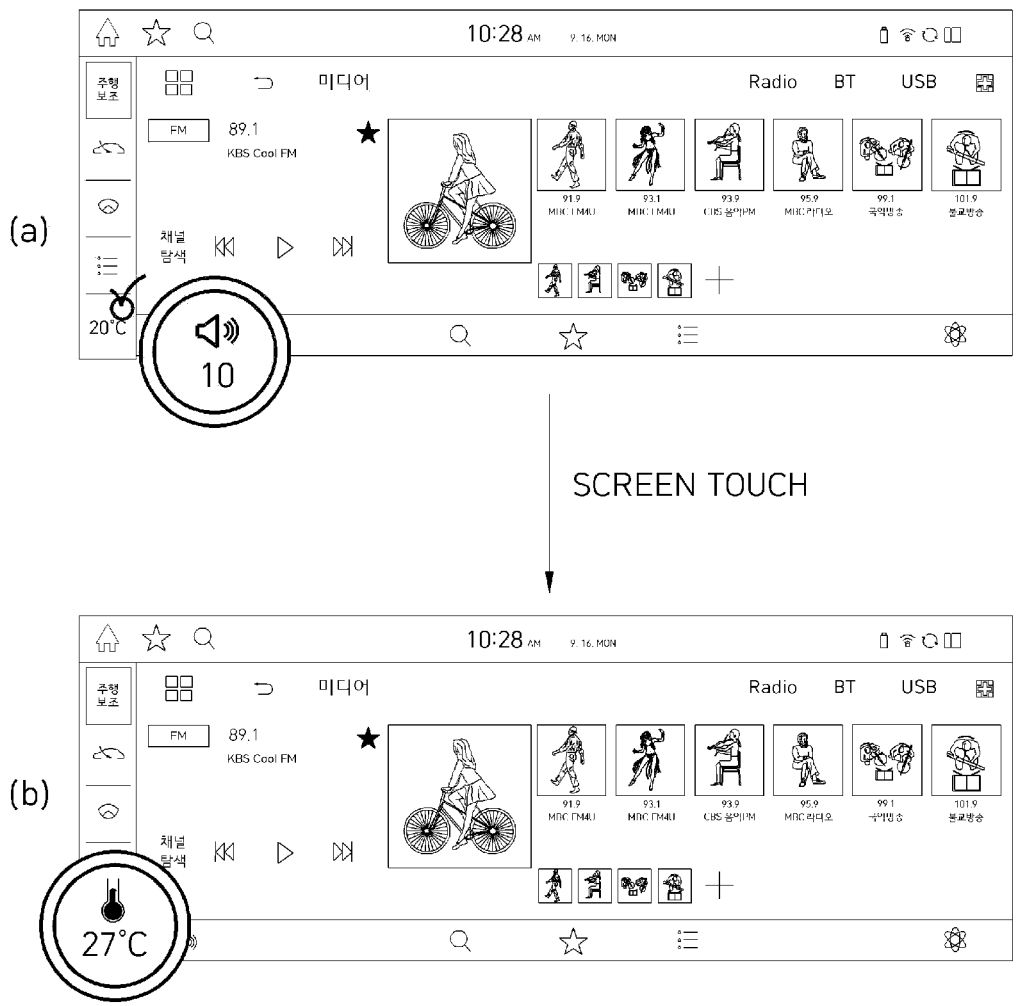

FIG. 6A and FIG. 6B are set of views illustrating a knob that is moved to a touch area according to another embodiment of the present invention.

According to another embodiment of the present invention, when a display such as an AVN/cluster is touched, a knob is automatically moved to an area in which the touch is input, and function control is performed at the corresponding area using the knob so that the ease of use is improved.

Referring to FIG. 6A, in the AVN, the knob is positioned under "play volume," and sound volume may be adjusted through a rotating/pressing operation of the knob.

As a user touches an air conditioning temperature in the AVN in FIG. 6A, the knob is automatically moved to under an area of the air conditioning temperature as illustrated in FIG. 6A.

The user may manipulate the knob moved under the area of the air conditioning temperature to set an air conditioning temperature.

As illustrated in FIG. 6B, in a case in which the knob is positioned on a display area and is more easily manipulated than manipulating by touch, the knob is moved in consideration of a user's touch input.

For example, as illustrated in FIG. 6B, when the knob performs a sound volume control function, in a case in which the user touches an air conditioning temperature setting area in the AVN, since temperature setting may be more easily performed by manipulating the knob than by touching (temperature setting through rotating action is more convenient than pressing a plurality of buttons), the knob is moved onto the air conditioning temperature setting area, and a set temperature is set by manipulating the knob as illustrated in FIG. 6B.

Figure 7:
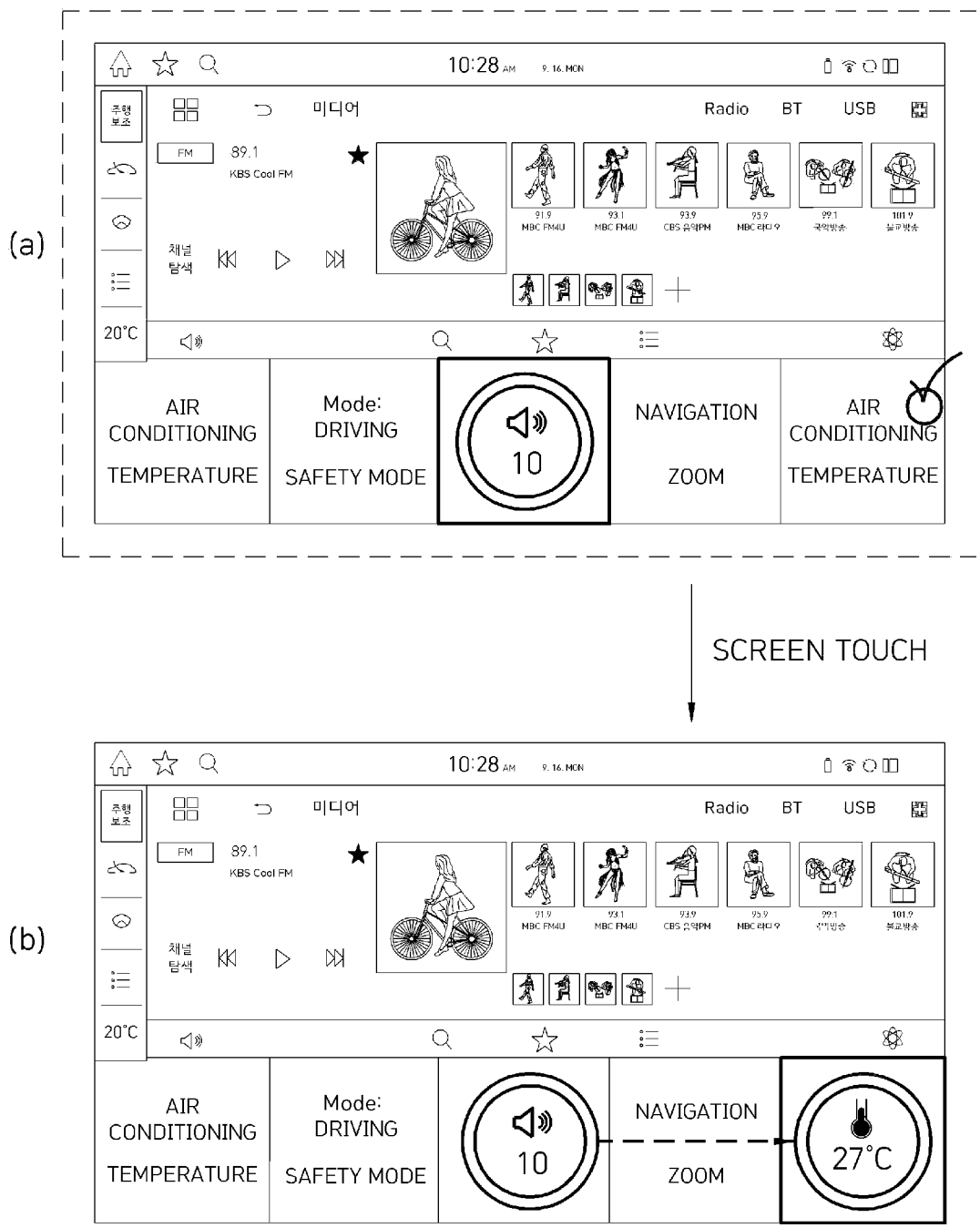
FIG. 7 is a set of views illustrating the knob that is moved to a touch area on a display according to another embodiment of the present invention.

FIG. 7 is a set of views illustrating the knob that is moved to a touch area on the display according to another embodiment of the present invention.

As illustrated in FIG. 7, in a case in which the knob is on the display area, the knob is positioned on a playback sound volume, and high or low sound volume is controlled by manipulating the knob.

In this case, as illustrated in FIG. 7, a touch input for an air conditioning temperature area is received in the display screen, a processor 130 moves the knob to the air conditioning temperature area which is the touched area, and a rotary action of the knob is performed on the air conditioning temperature area so that a setting temperature is set to an air conditioner.

Figure 8:
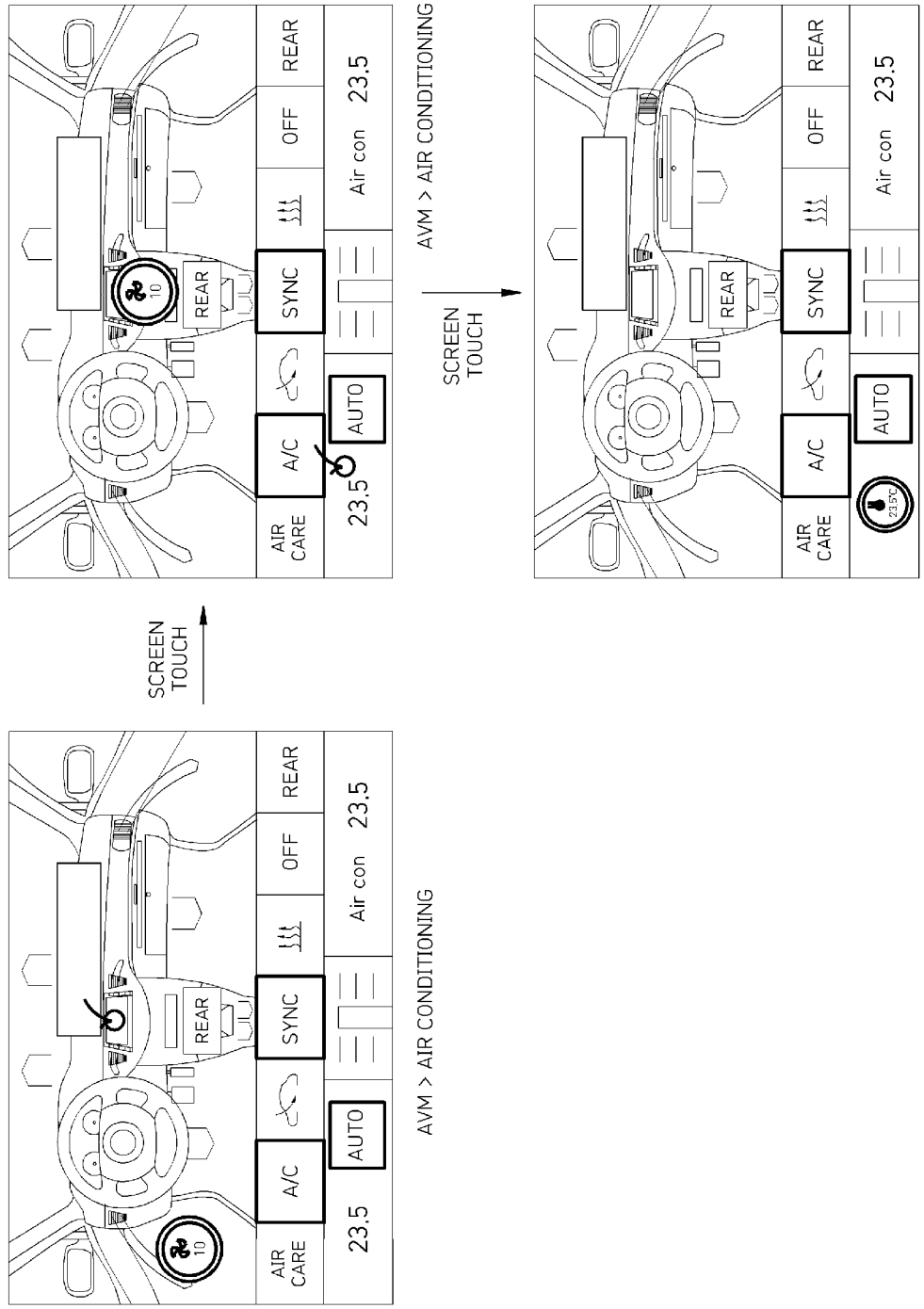
FIG. 8 is a view illustrating the knob that is moved to a touch area in a screen according to another embodiment of the present invention.

FIG. 8 is a view illustrating the knob that is moved to a touch area in a screen according to another embodiment of the present invention.

The display screen displays a vehicle seat arrangement image and a function menu provided to each seat.

When a touch for an area of which a function is performable is input in the display screen (for example, a driver seat air conditioning area as illustrated in FIG. 8), the knob is moved to the area to which a touch signal is input.

That is, in a case in which a screen for an air conditioning area is touched, the knob is moved to the corresponding screen to adjust an air quantity, and as a temperature setting area is touched in the corresponding screen, the knob is moved onto the temperature setting area so that a setting temperature may be adjusted by manipulating the knob.

Figure 9:
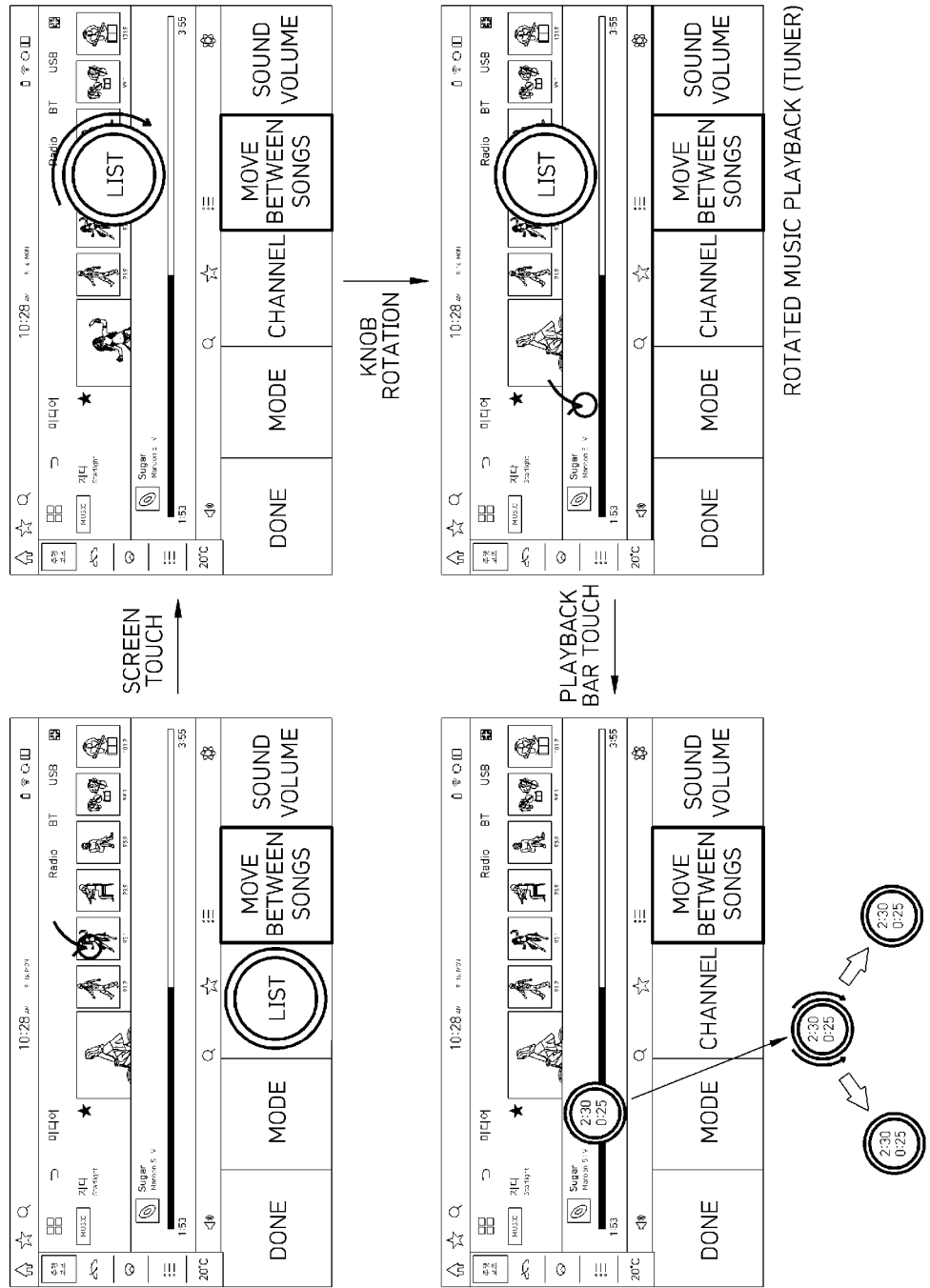
FIG. 9 is a view illustrating the control of a playback player according to another embodiment of the present invention.

FIG. 9 is a view illustrating the control of a playback player according to another embodiment of the present invention.

In the playback player, a music screen and a playback bar are distinguished, and the processor 130 controls movement of the knob for each touch signal input and sub-functions suitable for functions in consideration of operation of the knob (function control requiring sequential control).

That is, when the knob is moved according to a screen touch, a song selected when the knob is rotated is played, and even when the playback bar is touched to check a playback bar feedback screen, a knob button is disposed at a left side.

Figure 10:
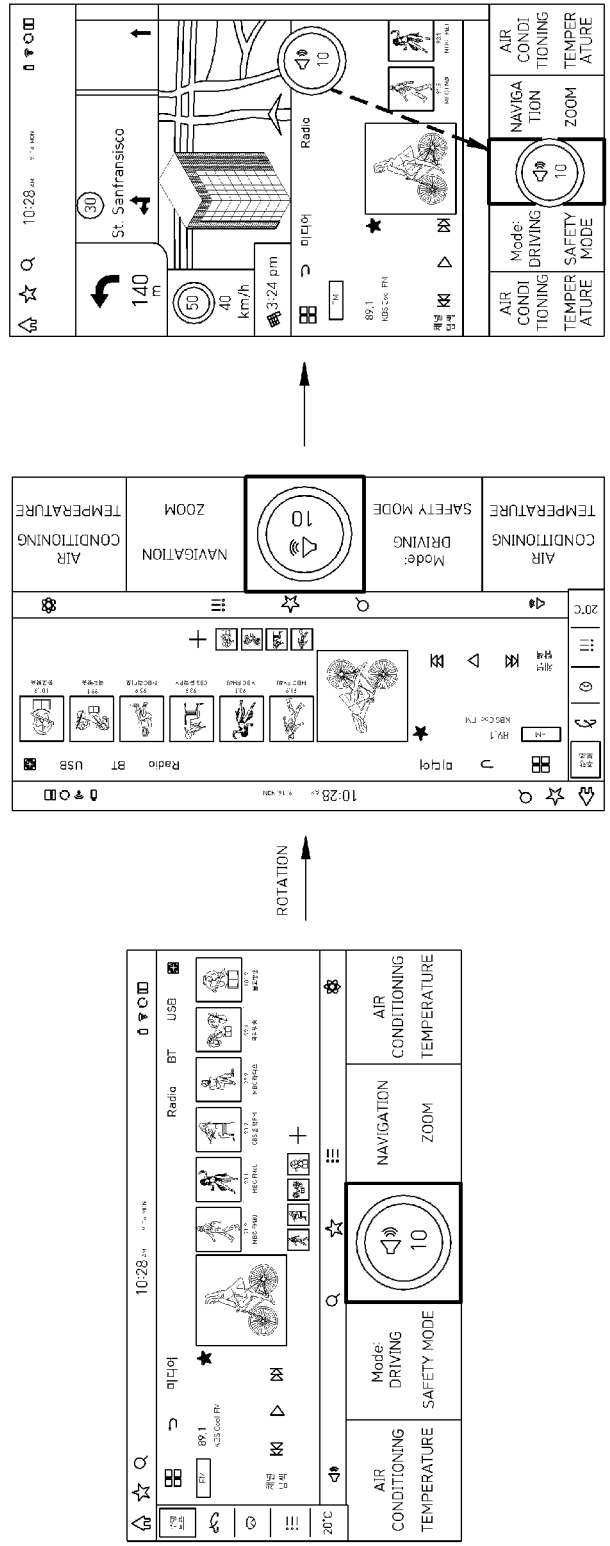
FIG. 10 is a view illustrating the rotation of the display and the movement of the knob according to another embodiment of the present invention.

FIG. 10 is a view illustrating the rotation of the display and the movement of the knob according to another embodiment of the present invention, In a lower end of the display, areas of air conditioning temperature, driving safety mode, volume, navigation, and air conditioning temperature are disposed.

As illustrated in FIG. 10, as the display is rotated from landscape setting to portrait setting, the knob is moved to coordinates of a menu area at which the knob has been positioned in consideration of a menu area in the display.

Figure 11:
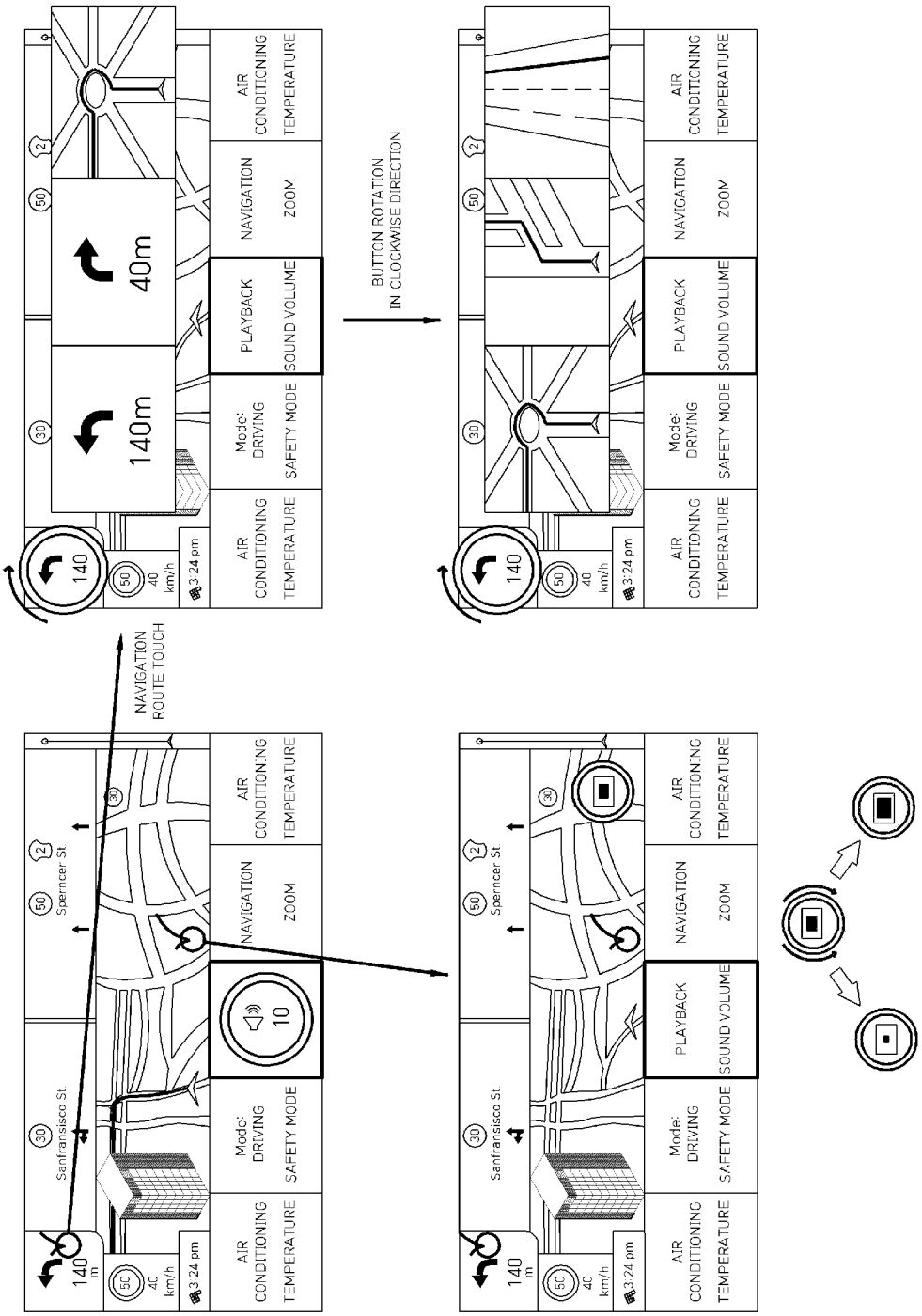
FIG. 11 is a view illustrating the control of a navigation screen according to another embodiment of the present invention.

FIG. 11 is a view illustrating the control of a navigation screen according to another embodiment of the present invention.

When a navigation screen is touched, a zoom-in/out is disposed beside the screen to check feedback of the screen. In this case, the zoom-in or zoom-out is performed by controlling the knob to be rotated in a clockwise/counter-clockwise direction.

In a case in which a route guidance area is touched in FIG. 11, when a rotary button (knob) is moved, a related screen is displayed at a right side.

When the rotary button (knob) is rotated, a following route is displayed, and road information related to the route is displayed.

Figure 12:
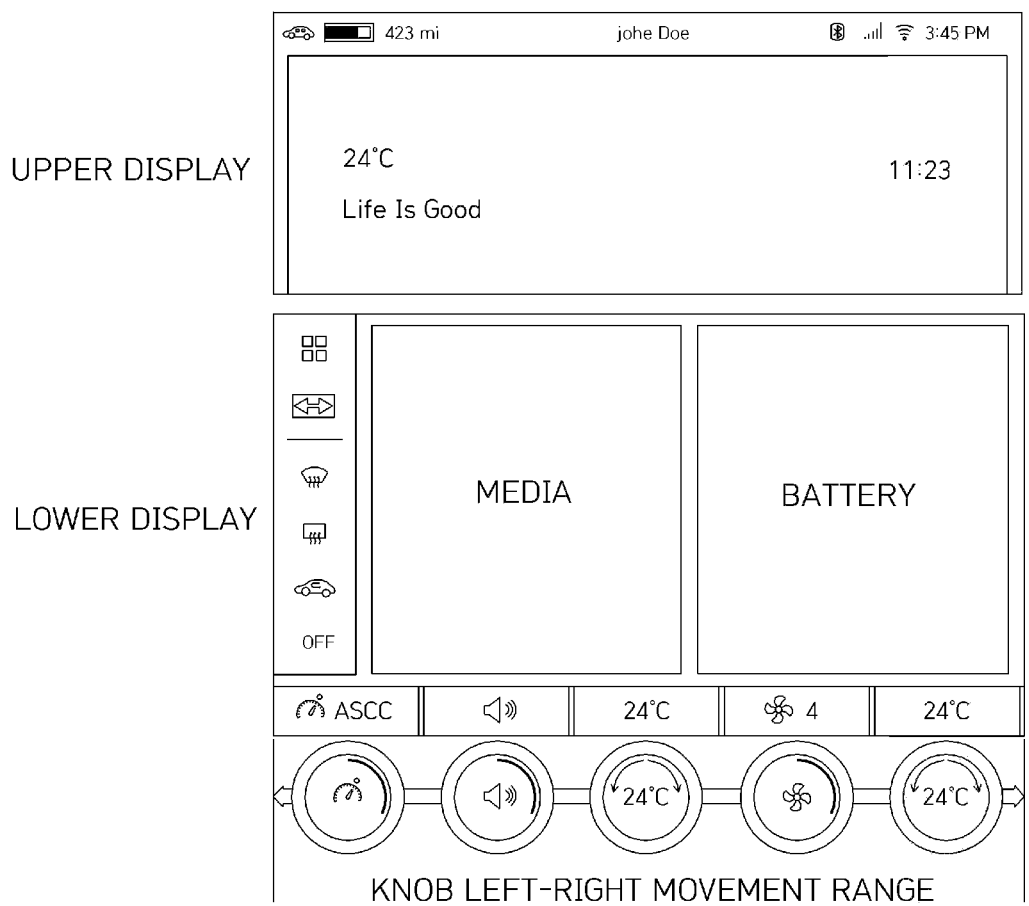
FIG. 12 is a view illustrating the arrangement of a knob according to still another embodiment of the present invention.

FIG. 12 is a view illustrating the arrangement of a knob according to still another embodiment of the present invention.

Temperature information, present playback music information, and present time information are displayed on an upper display, a menu, media, battery information, and the like are displayed on a lower display, and a knob is disposed under the display and moved within areas of advanced smart cruise control (ASCC), sound volume, driver seat temperature setting, and passenger seat temperature setting and performs control of a corresponding function in each area.

In this case, a menu of a setting area may be displayed according to a user setting or displayed to correspond to functions mainly performed according to a user history.

In addition, a menu corresponding to a recommended function may be displayed in consideration of a driver's driving status and an environmental status.

Figure 13:
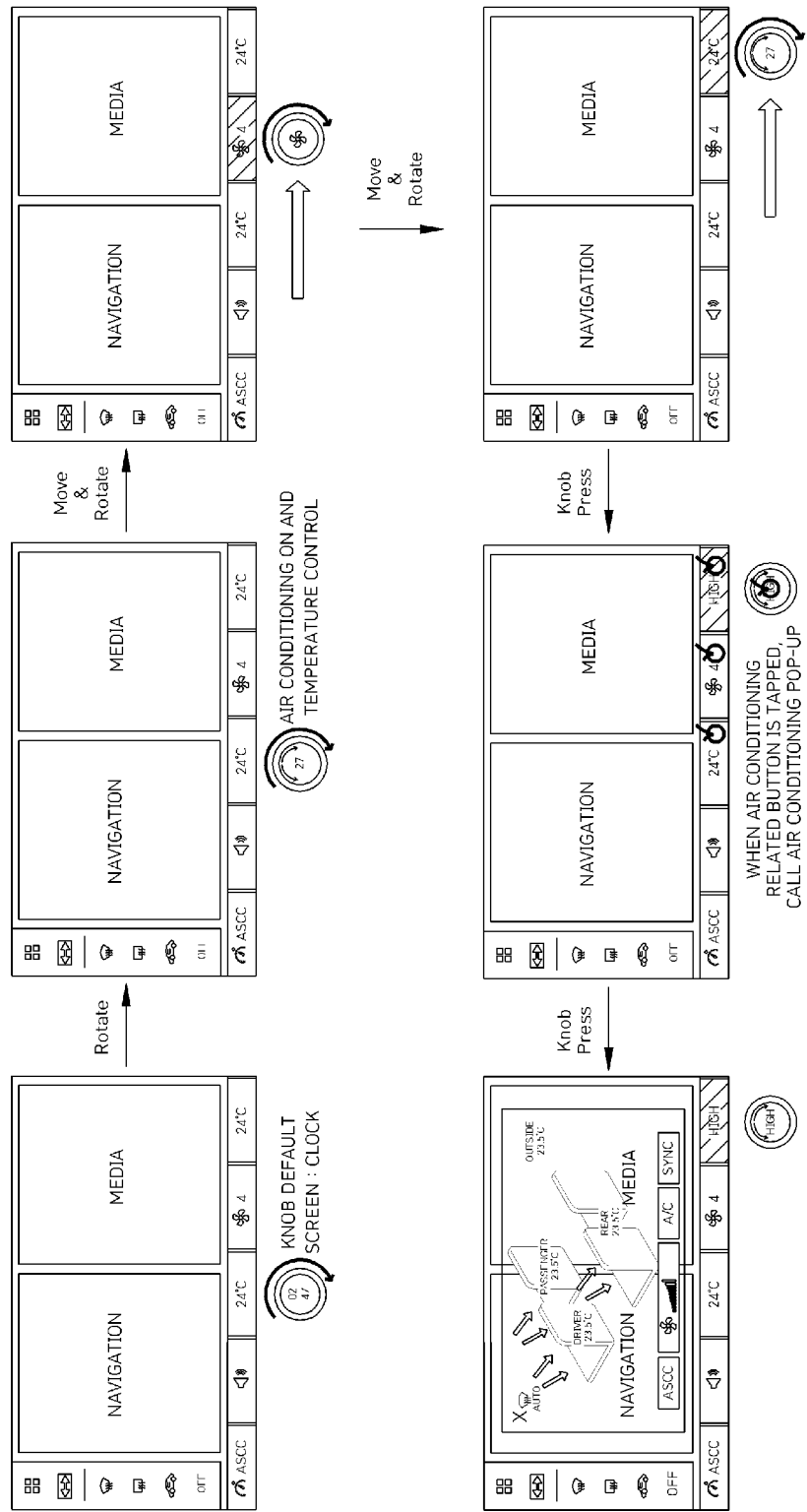
FIG. 13 is a view illustrating the control of an air using the knob disposed under a display according to still another embodiment of the present invention.

FIG. 13 is a view illustrating the control of an air conditioner using the knob disposed under the display according to still another embodiment of the present invention.

The knob disposed under a temperature setting area displays present time information on a default screen through an external surface of the knob.

As the knob is rotated, function control is performed for the temperature setting area in consideration of a present position of the knob to activate an air condition, and a setting temperature is adjusted according to a rotation direction of the knob.

As the knob is moved to an air quantity control area and a passenger seat temperature setting under the display, function control is performed according to each preset knob manipulation.

In this case, as the knob is moved, the function control is activatable, and as described above, the knob is also automatically movable to control the corresponding area according to a touch input for each function control area.

When a touch button related to air conditioning is tapped, an air conditioning pop-up is called, and in a pop-up screen, present temperature and preset temperature information is displayed for an area of each seat.

As described above, an area is selected by touching a setting target area (for example, a seat behind a driver), and a setting temperature of the selected area is adjustable by manipulating the knob.

Figure 14:
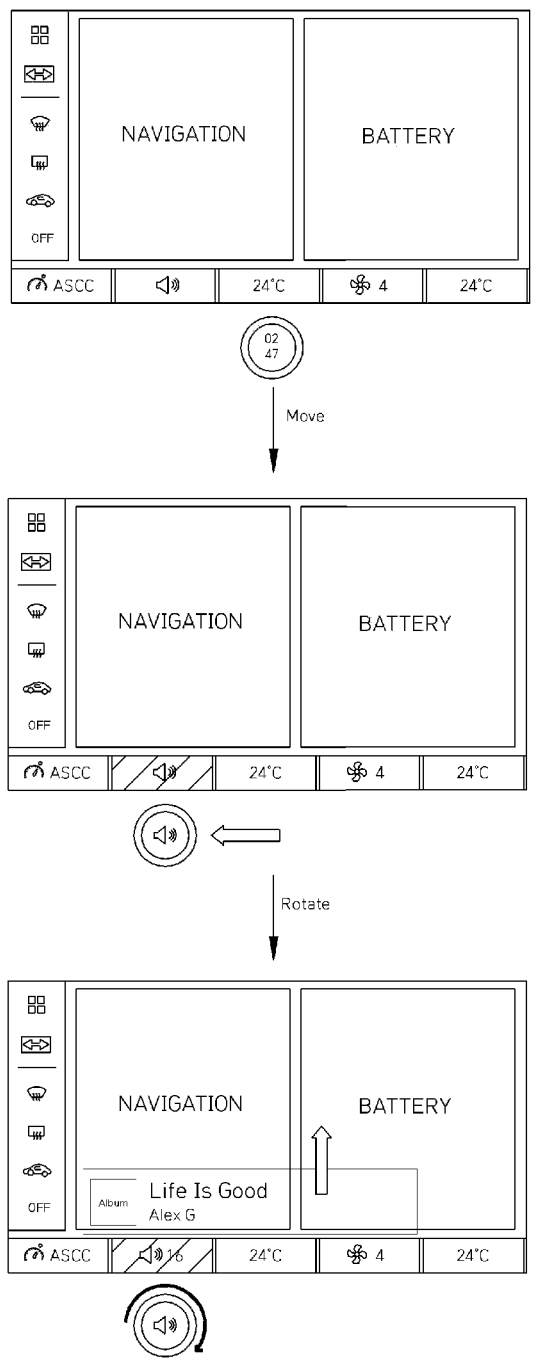
FIG. 14 is a view illustrating volume control using a knob disposed under the display according to still another embodiment of the present invention.

FIG. 14 is a view illustrating volume control using the knob disposed under the display according to still another embodiment of the present invention.

The knob disposed under a driver seat temperature setting area displays present time information.

In a case in which the knob is moved from under the driver seat temperature setting area to under a volume control area, volume information is displayed when a medium is being operated, a widget is displayed in a case in which the medium is being operated and there is no function, and system volume is adjusted in a case in which the medium is not operated.

Figure 15:
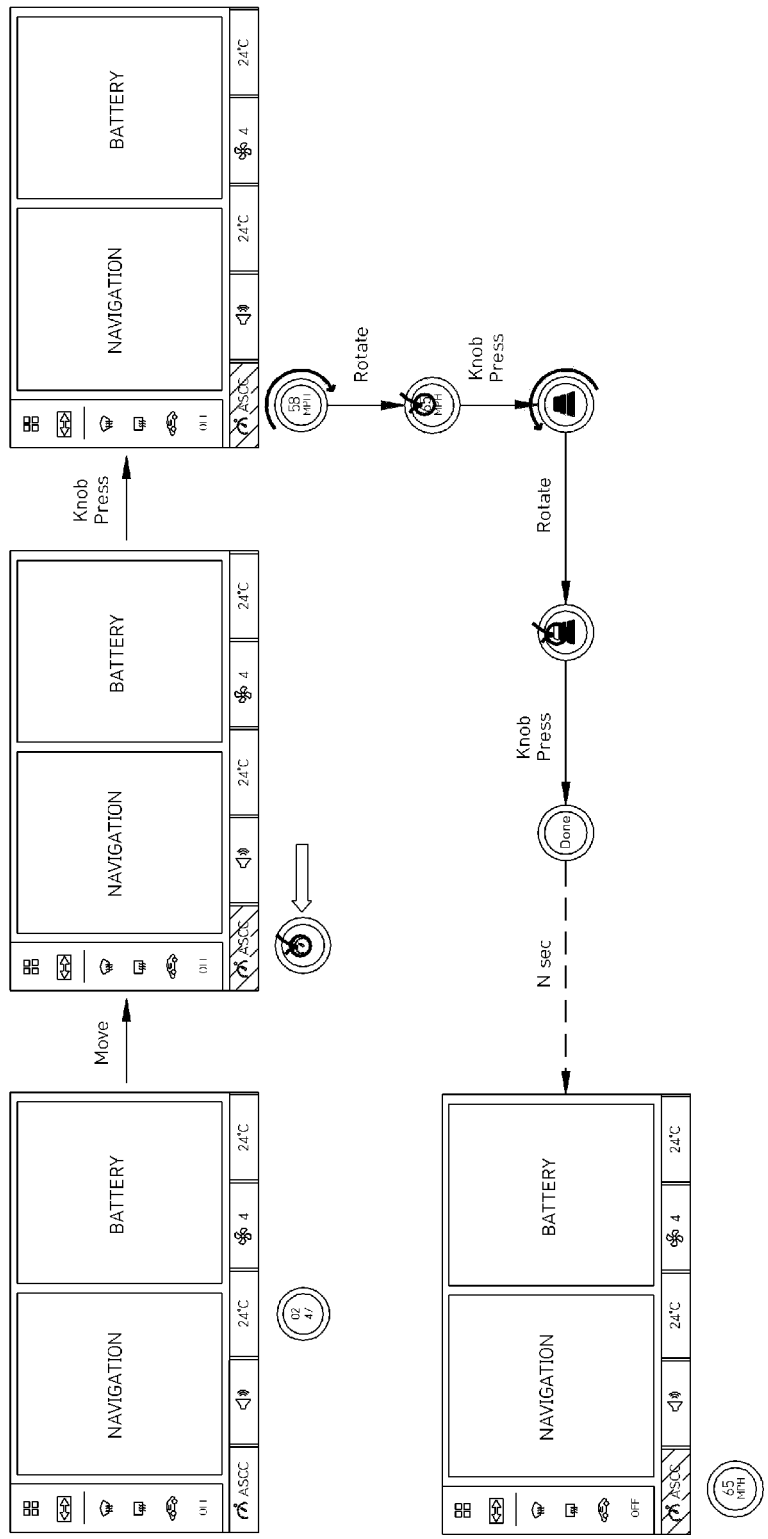
FIG. 15 is a view illustrating advanced smart cruise control (ASCC) using the knob disposed under the display according to still another embodiment of the present invention.

FIG. 15 is a view illustrating advanced smart cruise control (ASCC) using the knob disposed under the display according to still another embodiment of the present invention.

The knob disposed under the driver seat temperature setting area displays present time information on a default screen.

As the knob is moved to under an ASCC area, ASCC function control is activated, and present ASCC setting speed information is displayed on the knob.

As the user rotates the knob, ASCC setting speed information is displayed.

In a case in which the knob is pressed and rotated, and an action of pressing the knob is performed for a preset time (for example, several seconds), ASCC setting is changed.

Figure 16:
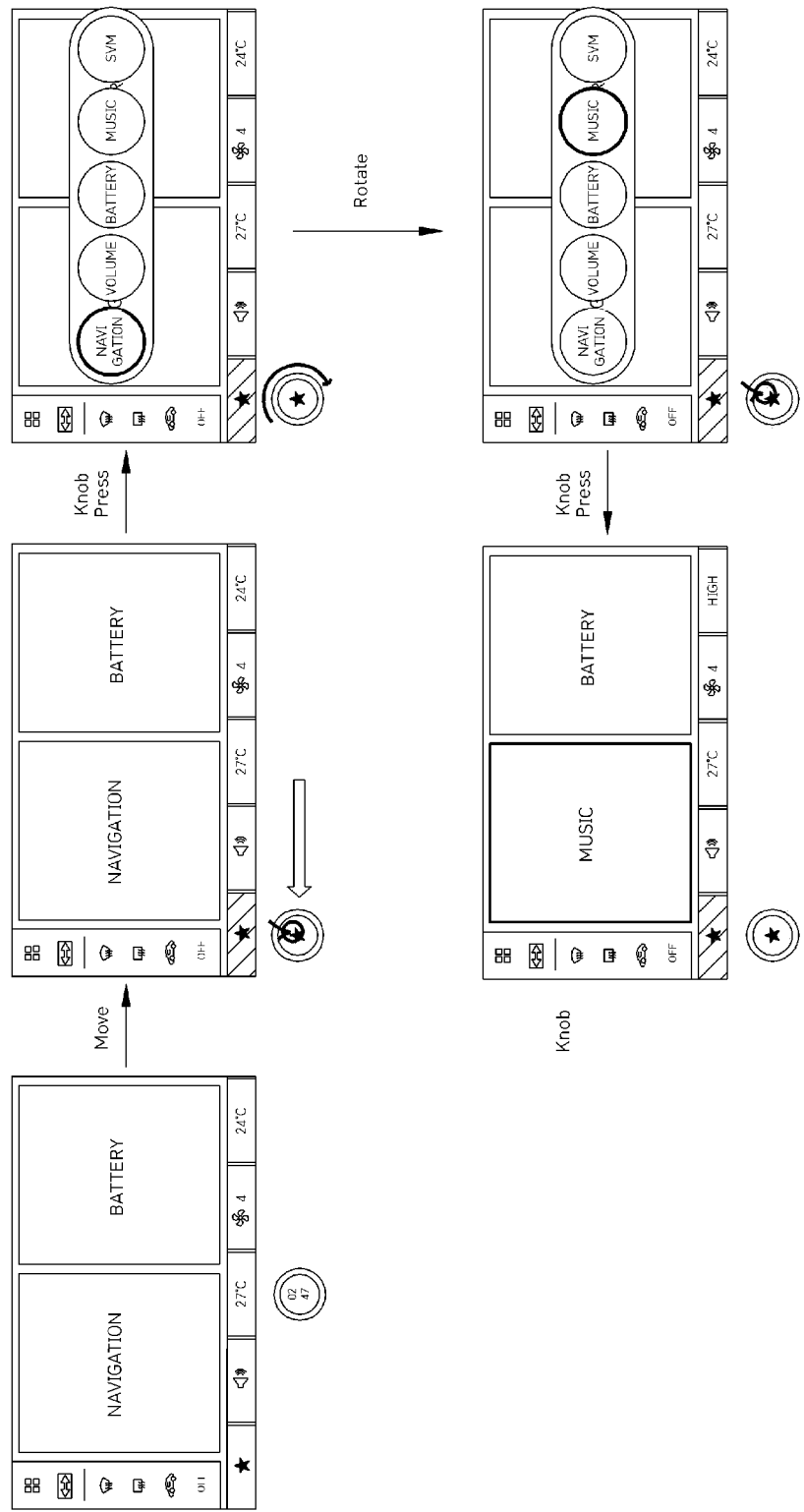
FIG. 16 is a view illustrating a user designated function using the knob disposed under the display according to still another embodiment of the present invention display.

FIG. 16 is a view illustrating a user designated function using the knob disposed under the display according to still another embodiment of the present invention display.

The knob disposed under the driver seat temperature setting area displays the present time information on a default screen.

When the knob is moved to under a favorite area, a menu, which is a user favorite menu (executed many times) is display, and as the knob is rotated, menu selection is performed.

When selection for a target menu (for example, music) is performed by pressing the knob, the selected menu (for example, music) is displayed on a display main screen.

Figure 17:
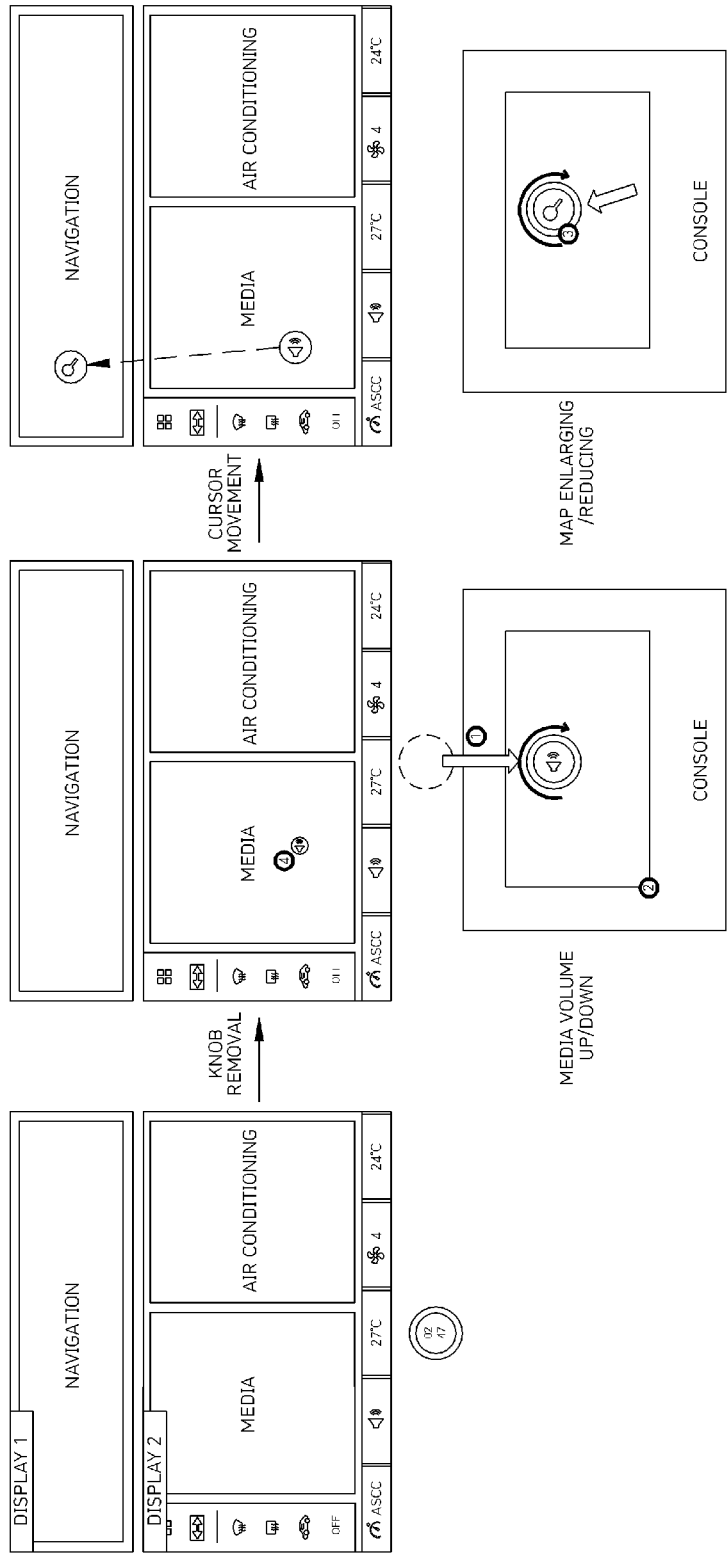
FIG. 17 is a view illustrating the display that is manipulated using the knob according to still another embodiment of the present invention.

FIG. 17 is a view illustrating the display that is manipulated using the knob according to still another embodiment of the present invention.

In a case in which the knob is placed in a specific area (for example, an arm rest), as the user manipulates the knob like a mouse, a manipulation for a multi-display is performed.

When the knob is attached to under the driver seat temperature setting area (the default screen displays the present time information), detached therefrom, and installed on a console, a mouse pad area is generated in the same proportion as a screen.

In a case in which the user uses the knob like the mouse so that a cursor is moved to a specific function, the cursor is changed to an icon (for example, sound volume) which is manipulatable using the knob in the corresponding function.

In a case in which the cursor is positioned for a specific function and the knob is rotated, the corresponding function is performed. For example, in the case of a navigation, a map is enlarged/reduced, and in the case of media volume, up/down control of sound volume is performed.

Figure 18:
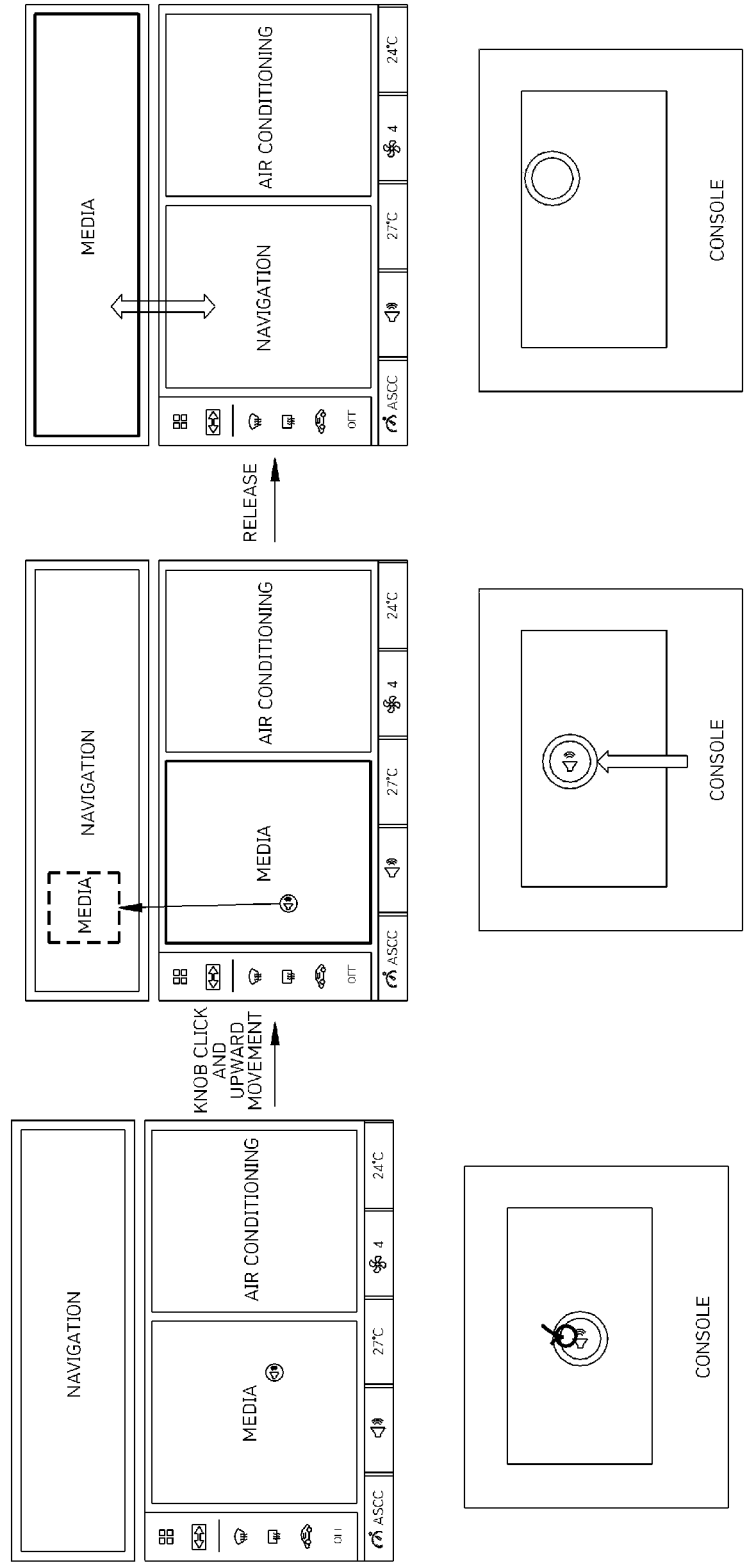
FIG. 18 is a view illustrating windows that are switched using the knob according to still another embodiment of the present invention.

FIG. 18 is a view illustrating windows that are switched using the knob according to still another embodiment of the present invention.

The knob disposed on the console is used to switch and adjust functions (windows) between displays.

The knob controls the displays like a mouse function in a console area.

When media in a display screen is dragged to an area on which the navigation is displayed using the knob on the console, a "media" area and a "navigation" area are. Through this, a window switching function is performed.

Meanwhile, the method of controlling a display using a knob according to the embodiment of the present invention may be implemented in a computer system or recorded in a recording medium. The computer system may include at least one processor, a memory, a user input device, a data communication bus, a user output device, and a storage. The above-described components communicate with each other through the data communication bus.

The computer system may further include a network interface coupled to a network. The processor may be a central processing unit (CPU) or a semiconductor device configured to process commands stored in the memory and/or the storage.

The memory and the storage may include various types of volatile or non-volatile storage media. For example, the memory may include a read-only memory (ROM) and a random-access memory (RAM).

Accordingly, the method of controlling a display using a knob according to the embodiment of the present invention may be implemented as a computer executable method. When the method of controlling a display using a knob according to the embodiment of the present invention is performed in a computer apparatus, computer readable commands may perform the method of the controlling according to the present invention.

Meanwhile, the above-described method of controlling a display using a knob according to the present invention is implementable as computer readable codes in the recording medium. The computer readable recording medium includes any type of recording medium for storing data which may be decoded by the computer system. For example, the computer readable recording medium may include a ROM, a RAM, a magnetic tape, a magnetic disk, a flash memory, an optical data storage device, and the like. In addition, the computer readable recording medium may be distributed to computer systems connected through a computer communication network and stored and executed as codes readable in a distribution manner.

According to the present invention, a position of a display in a vehicle can be easily changed by manipulating a knob, and the position of the display can be provided in a user customized manner according to a position of the knob.

The user can use a detachable knob to manipulate the knob at any position in the vehicle so as to easily control the display.

Since the knob can be moved and perform a function in the vehicle, there are effects in that various functions can be performed with a minimum number of knobs, and the number of buttons can be reduced.

Effects of the present invention are not limited to the above-described effects, and the other effects which are not described will be clearly understood by those skilled in the art through following descriptions.

What is claimed is:

1. A system for controlling, based on a user's manipulation of a knob, a function of a vehicle, the system comprising:
    an input part configured to receive position information of the knob with respect to (1) an area positioned below a display of a vehicle and having a movement range for the knob, or (2) a console of the vehicle having a preset plane area spaced apart from the display;
    a memory configured to store a display control program using the position information of the knob; and
    a processor configured to execute the display control program,
    wherein the processor is configured to control a function of the vehicle based on the position information according to movement of the knob and operation information of the knob, and
    wherein, in response to the knob being moved from the movement range of the area below the display to the preset plane area of the console, the processor is configured to control the display based on the position information of the knob with respect to the preset plane area generated at the console in the same proportion as the display.

2. The system of claim 1, wherein the processor is configured to transmit a control command corresponding to a function menu displayed on the area below the display based on the position information of the knob when the knob is moved over the movement range to a position corresponding to the function menu displayed in the area under below the display.

3. The system of claim 2, wherein the processor is configured to control the display to display a pop-up screen for a function corresponding to the function menu when the user's tab input is applied to the knob at a position corresponding to the function menu.

4. The system of claim 2, wherein the processor is configured to control a media volume of the vehicle when a medium is being played and control a system volume of the vehicle when the medium is not being played when the user's manipulation of the knob is recognized at a position corresponding to a sound volume control on the function menu.

5. The system of claim 1, wherein the processor is configured to control the function menu in response to the user's rotation or pressing of the knob or a time of the user's pressing and holding the knob.

6. The system of claim 1, wherein the processor is configured to display a menu corresponding to favorites on the display and display a function selected by the user's manipulation on a main screen of the display when the knob is moved to a favorite function menu area.

7. A system for controlling a function of a vehicle, comprising:
    an input part configured to receive at least one piece of position information of a knob within a movement range in an area under a display and position information of the knob within a preset plane area;
    a memory configured to store a display control program using the position information of the knob; and
    a processor configured to execute the display control program,
    wherein the processor is configured to control a function of the vehicle based on the position information according to a movement of the knob and operation information of the knob, and
    wherein the processor is configured to perform display control in consideration of position information of the knob within a console area in the same proportion as a display screen, when the knob is removed from the movement range in the area under the display and installed in a console which is the preset plane area.

8. The display control system of claim 7, wherein the processor is configured to display a cursor on the display screen according to the movement of the knob within the console area.

9. The display control system of claim 7, wherein the processor is configured to provide a window switching function when the cursor is moved according to a knob manipulation for a divided area in the display.

* * * * *